United States Patent Office 3,533,097
Patented Oct. 6, 1970

3,533,097
DIGITAL AUTOMATIC SYNCHRO CONVERTER
Marvin Sleven, Los Angeles, Calif., assignor to Whittaker Corporation, Los Angeles, Calif., a corporation of California
Filed Apr. 26, 1965, Ser. No. 450,628
Int. Cl. G08c 9/04; H03k 13/02
U.S. Cl. 340—347                    16 Claims

ABSTRACT OF THE DISCLOSURE

A system for selecting the most favorable stator output voltage of a synchro and converting it to a digital indication of rotor position in which logic circuitry is provided to determine the output of the synchro which has the maximum voltage gradient in the 30° sector in which the rotor is positioned, and passing this optimum synchro output to an analog to digital converter where it is converted into a digital indication of synchro rotor position.

---

This invention relates to a system for converting a selected one of a plurality of analog signals to digital form, and more particularly relates to such a system for selecting the most favorable stator output voltage of a synchro and converting it to a digital indication of rotor position.

The angular position of a shaft or other rotatable element may be converted to its electrical equivalent by using the shaft to drive the rotor of a synchro, the output voltage appearing across each pair of stator terminals providing an indication of shaft angle position. While all three 120 degree separated stator output voltages are required to determine the angle, at any given shaft position one of the stator outputs is more desirable than the others to provide an angle reading within a selected sector. The most desirable output, of course, is the one that provides the highest gradient, that is, the largest change in output voltage per degree change in shaft position. For example, in the shaft position region of 0 to 30 degrees, the stator output commonly referred to in the literature as $S_3$–$S_1$ provides the highest gradient, and, in addition, this particular output is most linear in that region, as expressed by the ratio of the derivative of the function at 0 degrees to that at 30 degrees being most nearly equal to unity. This can be demonstrated as follows:

From 0°–30°, the output $S_3$–$S_1$ is equal to sin $\phi$ where $\phi$ is the angle of rotation of the shaft. The derivative of $S_3$–$S_1$ is therefore cos $\phi$. It follows that the derivative of $S_3$–$S_1$ at $\phi=0°$ equals 1.00 and at $\phi=30°$ equals 0.866. The ratio therefore is 1.155.

In this same 0°–30° region, the output $S_1$–$S_2$ is equal to sin (120°–$\phi$) and the derivative of $S_1$–$S_2$ is cos (120°–$\phi$). At $\phi=0°$, the derivative of $S_1$–$S_2$ is therefore 0.500 and at $\phi$–30° it is 0. The ratio therefore is infinite. The output $S_2$–$S_3$ is equal to sin (240°–$\phi$) and the derivative of $S_2$–$S_3$ is cos (240°–$\phi$). At $\phi=0°$, the derivative of $S_2$–$S_3$ equals 0.500; at $\phi$–30° it is 0.866. The ratio thus is 0.577.

From the foregoing it can be seen that in the region of 0 to 30 degrees, one stator output, $S_3$–$S_1$, provides the highest conversion benefits. In a like manner it can be shown that there exists an optimum stator winding for each 30 degree region, and thus if it is desired to convert the synchro output to digital or other coded form, the converter should be connected to whatever winding is optimum at the instant the conversion is to be made.

It is therefore an object of the present invention to provide a system for selecting one of a plurality of electrical signals and converting it to digital form.

It is also an object of the present invention to provide a system for determining which of a plurality of electrical signals has the most linear characteristic over a particular region of interest.

It is another object of the present invention to provide a system for selecting the most linear of a plurality of similar but phase displaced electrical signals and converting it to digital form.

It is a further object of the present invention to provide a system for selecting the most linear stator output of a synchro for any angular region in which the rotor is positioned and converting this output to produce a digital indication of rotor position.

It is a still further object of the present invention to provide such a system wherein said output is converted to digital form and stored in a counter.

It is yet a further object of the present invention to provide such a system wherein said counter is preset to a count representative of the starting point of said angular region, said preset count being either zero or a multiple of 30 degrees.

It is yet another object of the present invention to provide such a system wherein said counter is caused to add to or subtract from said preset count in accordance with the nature of the angular region in which the rotor is positioned.

These and other objects and advantages of the present invention will become more apparent upon reference to the accompanying descriptions and drawings in which:

FIG. 1 is made up of FIGS. 1A and 1B which when taken together illustrate in block diagram form the system of the present invention;

FIG. 2 illustrates the waveforms of the stator outputs of a synchro as the rotor is rotated; and FIG. 3 is made up of FIGS. 3A and 3B which when taken together form a schematic diagram of portions of the system of FIG. 1.

Briefly, the realization of the foregoing objects is achieved by providing a first matrix responsive to the polarities of the synchro stator output voltages for producing an output indicative of the 60° region in which the rotor is positioned. This output is then broken down in a second matrix to produce signals indicative of the 30° region in which the rotor is positioned. These latter outputs are used to control gating circuits which pass the optimum stator output voltage to an analog to digital converter which produces a series of output pulses representative of the position of the stator within the 30° region. These pulses are fed to a counter which is caused to be preset with a number representing either the starting point or end point of the particular 30 degree selected sector. If the starting point is preset then the pulses cause the counter to add. If the end point is selected the pulses cause the initial count to be reduced.

Figure 1A:
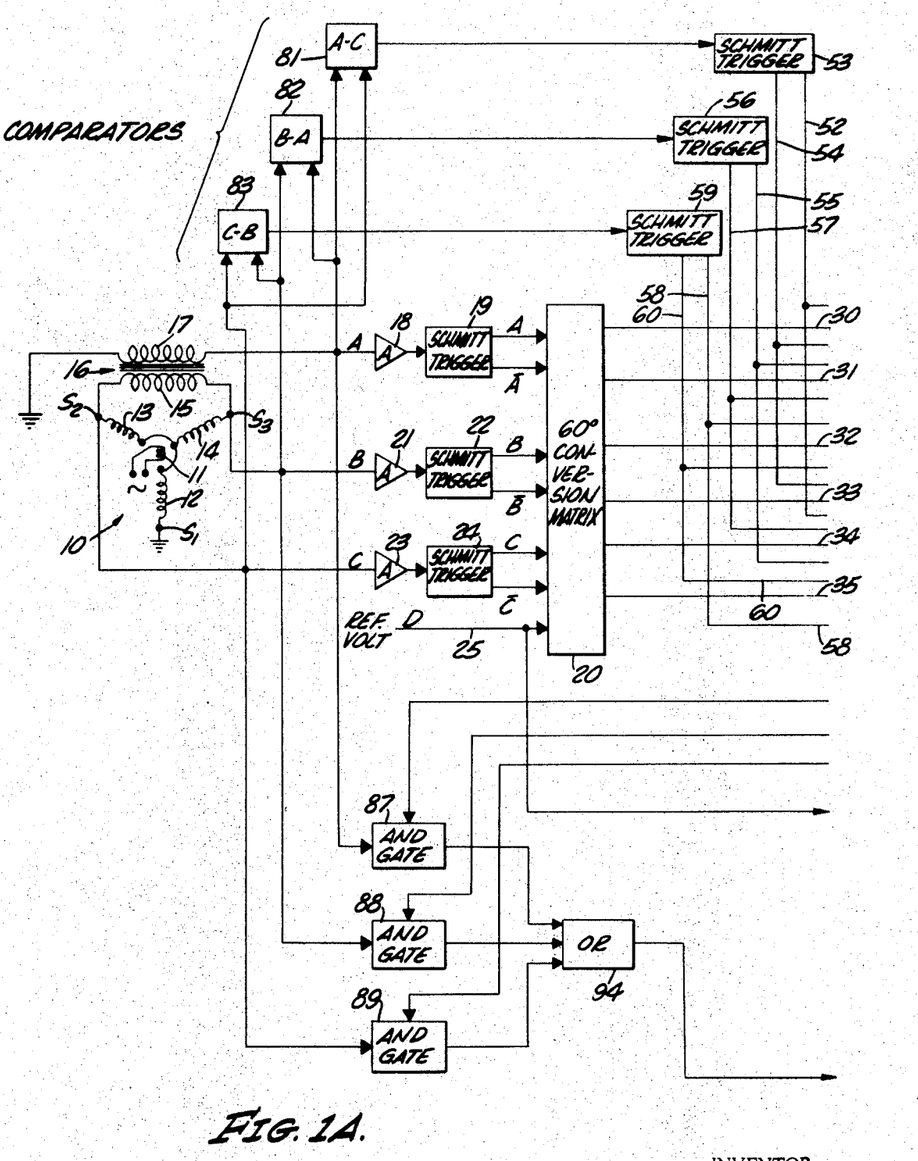

FIG. 1 illustrates a system of the present invention in block diagram form. A synchro, generally indicated at 10, has a winding 11 mounted on the rotor and three windings 12, 13 and 14 mounted on the stator 120° apart. The rotor winding 11 is energized by a source of constant A.C. voltage. One end of each of the stator windings 12, 13 and 14 is connected to a common junction while the other ends are connected to terminals $S_1$, $S_2$ and $S_3$ respectively. Terminal $S_1$ is grounded while terminals $S_2$ and $S_3$ are joined by the primary winding 15 of a transformer 16.

The secondary winding 17 of the transformer 16 has one end grounded and the other end connected to the input of an amplifier 18. The output of the amplifier 18 is fed to a Schmitt trigger circuit 19 which acts as a polarity detector and has two outputs connected into a 60° conversion matrix 20. For the sake of convenience, the voltage appearing between the terminals $S_2$ and $S_3$ is designated as A and the Schmitt trigger circuit 19 is connected so that when A is positive an output designated A is energized and when A is negative the output designated $\bar{A}$, or not A, is energized.

The voltage appearing between the terminals $S_1$ and $S_3$, designated as B, is fed to an amplifier 21, the output of which is fed to a Schmitt trigger circuit 22 similar to the trigger circuit 19. The two outputs of the Schmitt trigger 22, designated as B and $\bar{B}$ are also connected into the 60° conversion matrix 20. In a similar manner, the voltage appearing across the terminals as $S_1$ and $S_2$, designated C, is fed through an amplifier 23 to a Schmitt trigger circuit 24 and causes either the C or the $\bar{C}$ output to be energized. Of course, the voltages B and C could be inductively coupled to their respective amplifiers in the same manner as is the voltage A, or could be coupled in any other suitable manner, for example, by the use of differential amplifiers. These outputs are connected into the 60° conversion matrix 20. A reference voltage D, at line frequency, is fed to the 60° conversion matrix 20 along a line 25 and is ordinarily required since on alternate half cycles of the line frequency, all stator outputs reverse.

Figures 2, 3B:
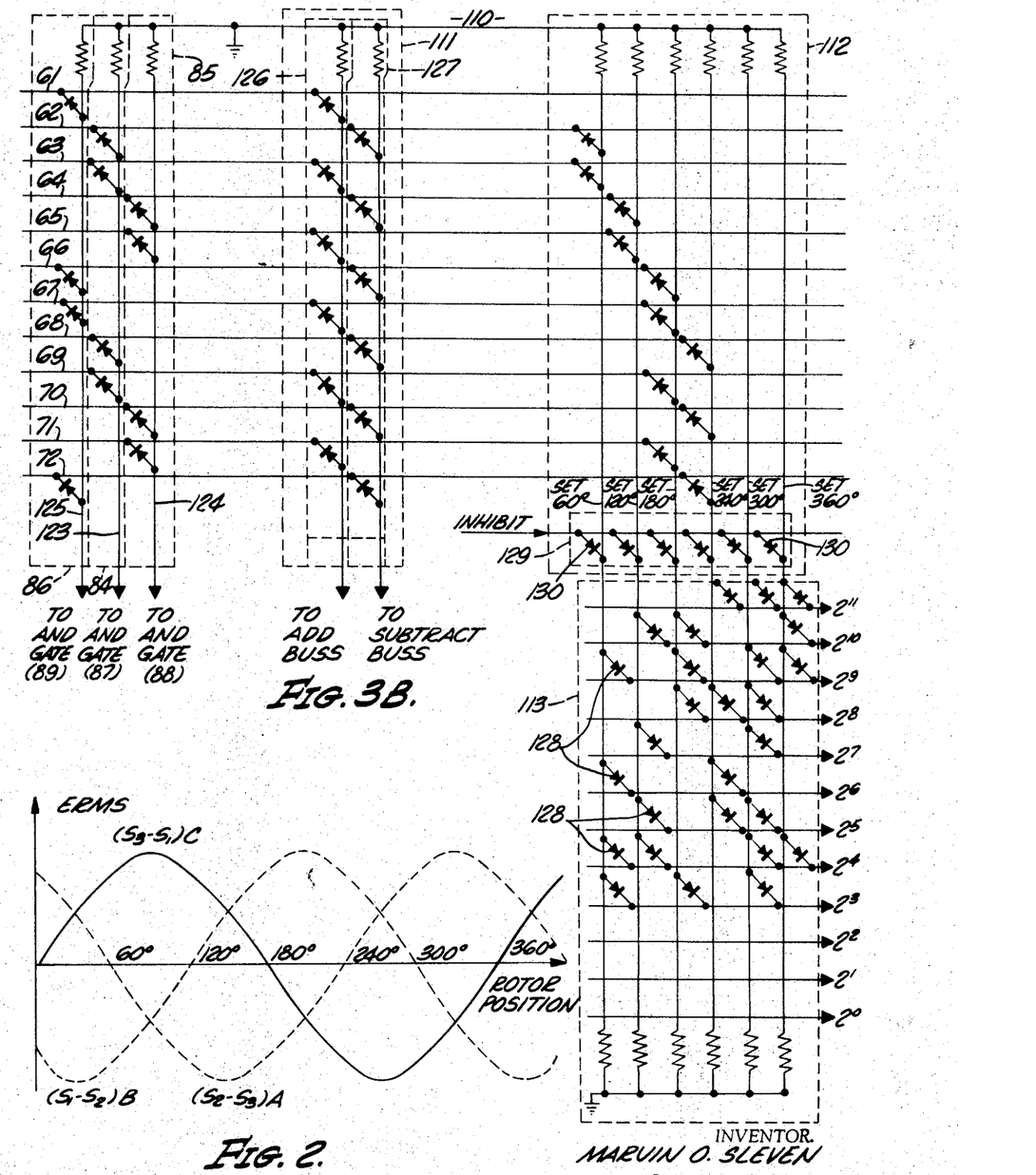

The 60° conversion matrix 20 serves to determine in which of six 60° regions the rotor position falls and to produce an output along one of six output lines 30–35 in accordance with this determination. This determination is made easy by the fact that the three outputs A, B and C of the synchro 10 have different relationships in each of these regions, the relationships being defined by the outputs of the Schmitt trigger circuits 19, 22 and 24. These relationships can be seen by reference to FIG. 2 in which the envelope of the excitation or line frequency is shown for each stator winding as the rotor rotates through 360 degrees. It can be assumed that when the envelope waveforms are positive, the instantaneous output is in phase with the line reference D and when they are negative, the instaneous outputs are 180 degrees out of phase with reference D. For example, it can be seen that the region of 0 to 60° can be defined by the statement:

$$A \bar{B} C D$$

which indicates that the rotor must be in this region when the stator output voltages A and C and the reference voltage D are simultaneously positive and the stator output voltage B is negative. The following table indicates the defining statements for each 60° region where 1 is positive and 0 is negative.

TABLE I

| Region | A | B | C | D |
|---|---|---|---|---|
| 0–60° | 1 | 0 | 1 | 1 |
| 60–120° | 0 | 0 | 1 | 1 |
| 120–180° | 0 | 1 | 1 | 1 |
| 180–240° | 0 | 1 | 0 | 1 |
| 240–300° | 1 | 1 | 0 | 1 |
| 300–360° | 1 | 0 | 0 | 1 |

Each of the output lines 30–35 of the 60° conversion matrix 20 is connected to an input of a 30° conversion matrix 36. The function of the matrix 36 is to break the 60° region signals down to 30° region signals. The matrix 36 includes twelve AND circuits 37 through 48. The AND circuit 37 has one input connected to the line 30 and the other input connected to a first output line 52 of a Schmitt trigger circuit 53. The AND circuit 38 also has one input connected to the line 30 but has its other input connected to the other output line 54 of the Schmitt trigger circuit 53.

The AND circuit 39 has one input connected to the line 31 and the other input connected to one output line 55 of a Schmitt trigger circuit 56. The AND circuit 40 has one input connected to the line 31 and the other input connected to the other output line 57 of the Schmitt trigger circuit 56. The AND circuit 41 has one input connected to the line 32 and the other input connected to one output line 58 of a Schmitt trigger circuit 59. The AND circuit 42 has one input connected to the line 32 and the other input connected to the other output line 60 of the trigger circuit 59.

The AND circuit 43 has one input connected to the line 33 and the other input connected to the output line 54 of trigger circuit 53. The AND circuit 44 has one input connected to the line 33 and has its other input connected to the output line 52 of trigger circuit 53. AND circuits 45 and 46 both have inputs connected to the line 34; circuit 45 has its other input connected to the output line 57 of trigger circuit 56 while AND circuit 46 has its other input connected to output line 55 of trigger circuit 56.

AND circuit 47 has one input connected to the line 35 and the other input connected to the output line 60 of trigger circuit 59. AND circuit 48 has one input connected to the line 35 and the other input connected to the output line 58 of the trigger circuit 59. The AND circuits 37–48 have output lines 61–72 respectively. A signal appearing on one of these output lines indicates the 30° region in which the rotor is positioned.

The operation of the Schmitt trigger circuits 53, 56 and 59 is similar to that of circuits 19, 22 and 24. The trigger circuits 53, 56 and 59 are connected to the outputs of comparators 81, 82 and 83 respectively and are sensitive to changes in polarity thereof. The comparator 81 has a first input connected to the stator output voltage A and a second input connected to the stator output voltage C and is arranged to make the subtraction $A-C$. Thus, when A is greater than C, the trigger circuit 53 will be in one state; when C becomes greater than A, the trigger circuit 53 will be caused to change states. The trigger circuit 53 will, of course, again change states when A again becomes greater than C.

Similarly, the comparators 82 and 83 are connected to make the subtractions $B-A$ and $C-B$ respectively. Changes in polarity of the outputs of the comparators 82 and 83 cause the trigger circuits 56 and 59 to change states, i.e., a different output is energized each time the relative magnitudes of the stator output voltages reverse.

The operation of the 30° conversion matrix 36 is as follows. Assume that the trigger circuits 53, 56 and 59 are initially set so that the output lines 52, 55 and 58 are energized when the outputs of the comparators 81, 82 and 83 are positive and the output lines 54, 57 and 60 are energized when the outputs of the comparators go negative. Let it further be assumed that the rotor is positioned somewhere within the 0–30° region.

As can be seen from FIG. 2, in this region the voltage A will be greater than the voltage C and thus the output from the comparator 81 will be positive and the output line 52 of the trigger circuit 53 will be energized. Since the conditions necessary for the 60° conversion matrix 20 to produce an output on the line 30 are met, i.e., $A \bar{B} C D$, both inputs of the AND circuit 37 will be energized and consequently an output will appear on the line 61. The AND circuit 38 remains de-energized because its input connected to the output line 54 of the trigger circuit 53 is de-energized. Each of the other AND circuits 39–48 remains de-energized because each of the lines 31–35 is de-energized. Each of the other AND circuits 38–48 operates in the same manner, and thus it can be seen that at any instant a single output line of the matrix 36 is energized.

As can be seen from FIG. 2, and as previously discussed, it is desirable to use the stator output voltage C in the region from 0 to 30°; the voltage A in the regions 30° to 60° and 60° to 90°; the voltage B in the regions 90° to 120° and 120° to 150°; the voltage C in the regions 150° to 180° and 180° to 210°; the voltage A in the regions 210° to 240° and 240° to 270°; the voltage B in the regions 270° to 300° and 300° to 330°; and the voltage C in the region 330° to 360°. As stated previously, an output signal on one of the lines 61–72 indicates the region in which the rotor is positioned. Such a signal can thus be used to control which of the stator output voltages is to be analyzed.

Lines 62, 63, 68 and 69 are connected to the inputs of an OR circuit 84 so that this circuit produces an output when any of these lines are energized. An output is therefore produced whenever the rotor is positioned in the regions of 30° to 60°, 60° to 90°, 210° to 240° or 240° to 270°. These regions are, of course, those regions in which it is desirable for stator output voltage A to be used.

In a similar manner, lines 64, 65, 70 and 71 are connected to the inputs of an OR circuit 85 and thus this OR circuit produces an output when it is desired to use the output voltage B. The lines 61, 66, 67 and 72 are connected to a similar OR circuit 86 which produces an output signal when it is desired to use the stator output voltage C.

The OR circuit 84 has its output connected to the gating input of an AND gate 87, the signal input of which carries the stator output voltage A. The output of the OR circuit 85 is connected to the gating input of an AND gate 88, the signal input of which carries the stator output voltage B. Similarly, the output of the OR circuit 86 is connected to the gating input of an AND gate 89, the signal input of which carries the stator output voltage C.

The outputs of the AND gates 87, 88 and 89 are connected to the inputs of an OR circuit 94, the output of which is fed to an analog to digital converter, as is the reference voltage D. The output of the analog to digital converter 95 is fed to a counter 96, the contents of which is indicated by a display device 97.

Figure 1B:
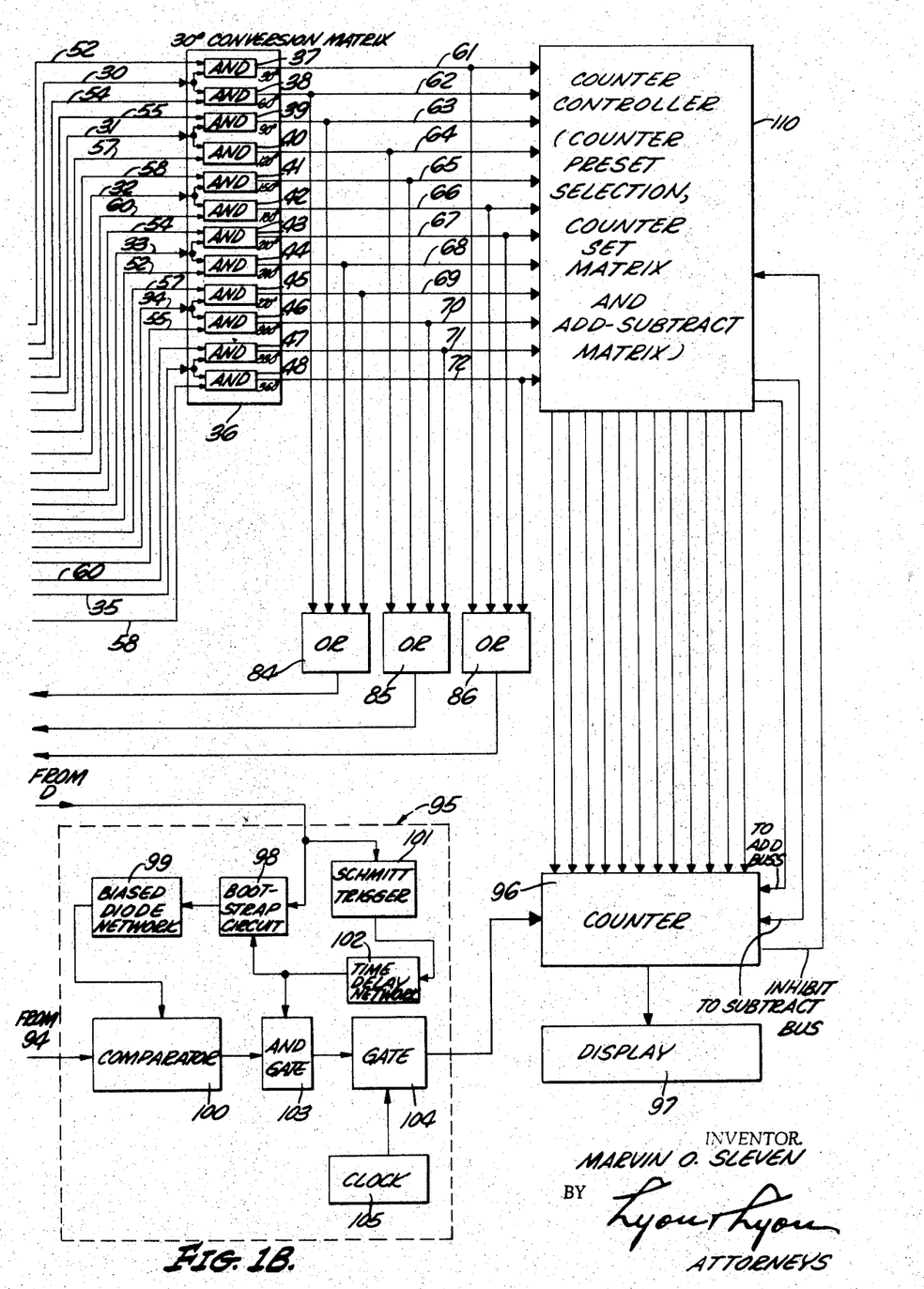

The details of the analog to digital converter 95 are shown in FIG. 1B. The system operates to make a digital conversion on each cycle of the carrier. Thus a new digital number is generated 400 times a second for a 400 c.p.s. synchro system or 60 times a second for a 60 c.p.s. synchro system. Since the peak amplitude of each cycle of the carrier frequency sine wave provides the measure of angular rotation, it is possible to make the analog to digital conversion by generating a ramp voltage during the time the sine wave is near its peak and comparing the two voltages. Although the sine wave envelope of the stator output is approximately linear in the region of 0 to 30 degrees, the deviation from linearity must be corrected to achieve high accuracies. A ramp sweep whose linearity is modified by several diode clipping levels to make the sweep approximate a sine wave from 0 to 30 degrees will provide the necessary accuracy. By making the reference voltage D the source of voltage for generation of the ramp, the output of the converter can be made independent of line voltage variations.

Turning now to FIG. 1B, the reference voltage D is fed to the input of a sweep generating circuit, for example, a bootstrap circuit 98. The ramp sweep generated by bootstrap circuit 98 is fed to a network 99 of biased diodes set to conduct at different levels whereby the slope of the sweep is reduced as its amplitude increases. The output of the biased diode network 99 is fed to one input of a comparator 100, the other input of which is coupled to the output of the OR circuit 94. The reference voltage D is also fed to a Schmitt trigger 101 which is arranged to generate a pulse when the sinusoidally varying voltage D crosses zero in the positive going direction. This pulse is then passed through a time delay network 102 to the gating input of the bootstrap circuit 98 to cause the generation of the ramp to be initiated. The delay of the network 102 is such that the sweep is triggered in the region of peak amplitude of the stator carrier. Since the sine wave amplitude variation from 85° to 95° is within plus or minus 0.2%, the exact delay is not critical.

The output of the delay network is also applied to the gating input of an AND gate 103 which has its other input coupled to the output of comparator 100 and its output coupled to the gating input of a gate 104. The gate 104 has its signal input coupled to a clock 105 and its output coupled to the counter 96. The gate 104 is normally closed so that no pulses pass to counter 96. However, when the AND gate 103 receives a pulse from network 102, the gate 103 produces an output since the comparator 100 is producing an output signal reflecting a difference in magnitude between the stator output from the OR circuit 94 and the ramp voltage. The gate 104 is opened and the counter 96 receives pulses from clock 105. When the ramp voltage equals the stator voltage, the output from comparator 100 ceases, and the gate 104 is consequently closed.

From the foregoing description, it can be seen that as the rotor position changes from one 30° region to another, a different one of the OR circuits 84, 85 and 86 will produce an output with the result that the proper AND gate 87, 88, or 89 will be opened permitting the desired stator output voltage, either A, B or C, to pass through the OR circuit 94 to the analog to digital converter 95. There it is compared with a reference and a resultant series of pulses indicating its magnitude is fed to counter 96.

In addition to the pulse count itself, the counter requires additional information in order for it to register the proper rotor position information. Since the pulses to be fed to the counter from the converter 95 are only indicative of the position of the rotor within the selected 30 degree region, the counter must be preset to zero or some multiple of 60 degrees which lies nearest to the selected 30 degree sector. The counter must then be made to either add or subtract depending upon whether the preset count is at the beginning or end respectively of the 30 degree sector.

These various counter presetting functions are accomplished by means of a counter controller 110 which includes means for selecting the proper counter preset value, a counter set matrix and an add-subtract matrix, all of which will be more fully described in connection with FIG. 3. The counter controller 110 receives inputs from the lines 61–72 and in response thereto produces a plurality of different outputs which are fed to the counter. A first output presets the counter with a count representative of the angular distance, or number of 30° regions, that the rotor must pass through before coming to the midvalue of the 60° region in which it is presently positioned. Second and third outputs are supplied to the add and subtract busses of the counter so that the incoming pulses will be either added or subtracted to the preset count in accordance with the portion of the waveform being used. An input to the controller 110 from the counter 96 prevents or inhibits the controller from passing signals to the counter while the display device 97 is registering the count stored in the counter. This signal may conveniently be the inverse of the display inhibit signal conventionally generated by the counter to inhibit the operation of the display device while the count in the counter is changing.

Figure 3A:
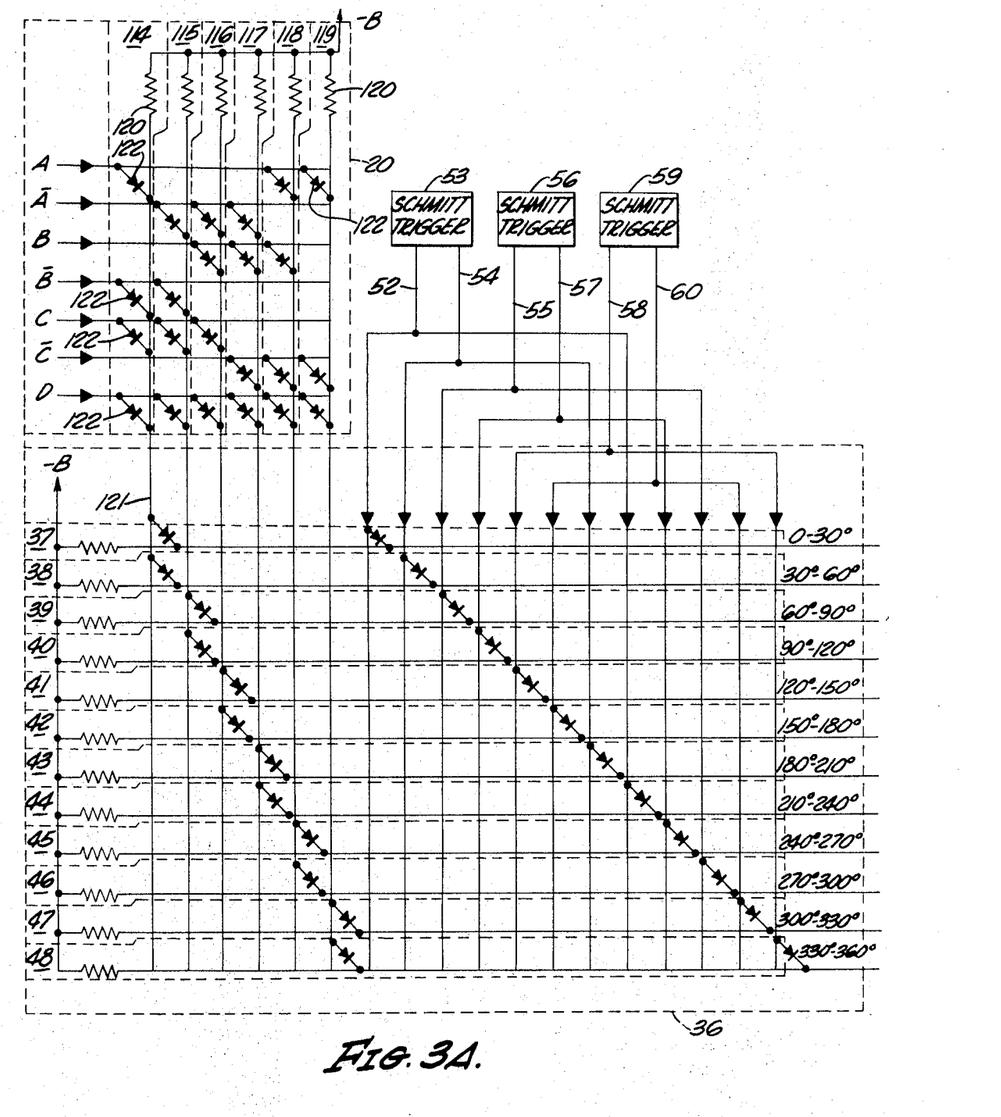

Turning now to FIG. 3, the details of the 60° conversion matrix 20, the 30° conversion matrix 36, the OR circuits 84, 85 and 86, and the components of the counter controller 110, namely an add-subtract matrix 111, a counter preset selection matrix 112, and a counter set matrix 113, are illustrated. The 60° conversion matrix includes six AND gates 114–119 which produce an output signal on the proper coincidence of input signals. As previously described in connection with Table I, each 60° region in which the rotor may be positioned represents a unique coincidence of the outputs A, $\overline{A}$, B, $\overline{B}$, C, $\overline{C}$ of the trigger circuits 19, 22 and 24 and reference signal D.

Each of the AND circuits 114–119 is similar in operation and only one need be described. For example, the AND circuit 114 includes a resistor 120 having one end connected to a source of negative potential and the other end connected to an output line 121. A plurality of diodes 122 are connected between the output line 121 and the input lines shown to be appropriate by Table I to produce an output signal indicating that the rotor is positioned in the 0 to 60° region, namely A, $\overline{B}$, C, D. This AND circuit operates in the conventional manner to produce a negative output signal on line 121 only when all of the inputs are energized.

The output lines from the AND circuits 114–119 of the matrix 20 lead into the 30° conversion matrix 36 which is made up of the AND circuits 37–48. Each of these AND circuits is similar in operation to the AND circuit 114 but has only two inputs instead of four. The first input of each of these AND circuits is the output of one of the AND circuits 114–119 and the other input is the output of one side of one of the trigger circuits 53, 56 and 59. Whenever negative pulses appear simultaneously at the inputs of one of these AND circuits 37–48 an ouput signal will appear on the corresponding one of the output lines 61–72 to indicate the 30° region in which the rotor is located.

As previously described, OR circuits 84, 85 and 86 are arranged with their inputs connected to selected ones of said lines 61–72. As can be seen, these OR circuits 84, 85 and 86 are made up of a plurality of diodes which connect lines 123, 124 and 125 to selected ones of the lines 61–72. These diodes are connected in the conventional manner to cause a negative pulse to appear on an output line 123, 124 or 125 whenever a negative signal appears on one of the lines 61–72 to which it is tied by a diode.

The output lines 61–72 of the 30° conversion matrix 36 are also connected into an add-subtract matrix 111 which comprises a pair of OR circuits similar to the OR circuits 84, 85 and 86. As can be seen, the OR circuit 126 will produce an output signal causing the counter to be set to add pulses whenever the stator output voltage chosen is going away from the zero crossing position of the waveform while the OR circuit 127 will produce an output signal causing the counter to subtract pulses whenever the chosen stator output voltage is approaching the zero crossing of the waveform. The manner in which these add and subtract pulses bias the counter to add or subtract incoming pulses is well known in the art and thus is not illustrated.

The output lines 61–72 also serve as the inputs of a counter preset selection matrix 112. This matrix serves to send a signal to a counter set matrix 113 which in turn serves to preset the counter with a number representative of the angle at which the waveform being used crosses zero, i.e., the midvalue of the region. This is accomplished by the use of simple OR circuits such as those previously described. Thus, when the rotor is within a region between 30° and 90° the stator output voltage A will be used and the matrix 100 will cause a "set 60°" signal to be sent to the matrix 113. This will cause the counter to be set at 60° and, because of the add subtract matrix 111, the counter will be caused to subtract pulses from this 60° value until the rotor position passes 60° and then the counter will be caused to add pulses until the 90° position is reached, at which time the output voltage B begins to be used and the matrix 112 causes a "set 120°" signal to be sent to the counter set matrix 100.

The counter set matrix 112, if a binary system is to be used, may be a binary coded matrix capable of setting a multi-stage counter at any desired number. For example, if it is desired to make each counting pulse equal to 0.1°, a twelve stage binary counter would be used. In such a system, the number 600 would represent 60° and thus the "set 60°" line would be connected by suitable diodes 128 to provide outputs on the output line of the matrix 113 corresponding to the values $2^3$, $2^4$, $2^6$ and $2^9$ so that binary counter will be preset with the binary number 000110100100. Each of the other outputs from the matrix 112 is similarly connected to energize the proper outputs of the matrix 113.

In order to prevent counts from being registered in the counter when it is displaying its contents, an inhibit gate 129 is provided between the counter preset selection matrix 112 and the counter set matrix 113. Whenever the display inhibit signal of the counter is being generated, each of the diodes 130 in the inhibit gate 129 are blocked and thus signals can pass between the matrix 112 and the matrix 113. However, when this inhibit signal is removed at the end of each analog to digital conversion cycle, any signals passing between these matrices are shunted by the diodes 130 and thus the matrix 113 will remain at its previous value, regardless of any changes in the position of the rotor.

From the foregoing description, it can be seen that a system has been provided which is capable of determining which of a plurality of electrical signals is most useful and causing this selected signal to be further operated on. While the invention has been described as particularly applicable for selecting the optimum stator output voltage of a synchro and causing this voltage to be converted to its digital representation, it should be obvious that the system is equally useful in other applications where each of a plurality of signals has recurring periods of maximum usefulness. It should also be apparent that the invention is not restricted to converting a selected signal to its digital equivalent but could be used in any situation where it is necessary to select a signal having optimum characteristics at a given time from a plurality of signals having varying characteristics. It should also be obvious to those skilled in the art that the various details shown and described are illustrative only and not restrictive, and that their equivalents could equally well be used within the scope of the invention.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A system for converting into digital form an optimum one of a plurality of electrical analog signals, each of said signals having a level which varies periodically as a function of an external quantity, said variations following similar but time displaced curves as said external quantity changes from region to region within a predetermined range comprising means for producing said signals; means coupled to said signal producing means and responsive to said signals for producing outputs indicative of the instantaneous polarity of each of said signals; comparator means coupled to said signal producing means for producing output signals indicative of the relative levels of different pairs of said electrical signals; means coupled to said polarity indicating means and said comparator means for producing an output indicative of the region within said range in which said external quantity lies; an analog to digital converter; gate means operable to selectively pass any one of said signals to said converter; and means coupled to said region indicating means and responsive to the output thereof for operating said gate means to pass only the signal which is optimum in the region in which the external quantity lies.

2. A system for determining the region within a range in which an external quantity lies, comprising means for producing a plurality of electrical signals, each of said signals having a level which varies as a function of said external quantity, said variations following similar but time displaced curves as said external quantity changes over said range; means coupled to said signal producing means and responsive to said signals for producing outputs indicative of the instantaneous polarity of each of said signals; a plurality of coincidence means, each of said coincidence means having inputs coupled to different selected outputs of said polarity indicating means and producing an output signal upon energization of all of said selected outputs; a plurality of comparator means, each of said comparator means being coupled to said signal producing means for comparing the relative levels of a different pair of said electrical signals and producing a signal indicative thereof; and means coupled to said coincidence means and said comparator means for producing an output indicative of the region within said range in which said external quantity lies.

3. A system for determining the region within a range in which an external quantity lies, comprising means for producing a plurality of electrical signals, each of said signals having a level which varies as a function of said external quantity, said variations following similar but time displaced curves as said external quantity changes over said range, means coupled to said signal producing means and responsive to said signals for producing outputs indicative of the instantaneous polarity of each of said signals, a first plurality of coincidence means, each of said coincidence means having inputs coupled to different selected outputs of said polarity indicating means and producing an output signal upon energization of all of said selected outputs, a plurality of comparator means, each of said comparator means being coupled to said signal producing means for comparing the relative levels of a different pair of said electrical signals, means coupled to each of said comparator means for producing a signal indicative of the relation of said relative levels, and a second plurality of coincidence means, each of said second coincidence means having a first input coupled to one of said relative level indicating means and a second input coupled to the output of one of said first coincidence means, each of said second coincidence means producing an output signal only when both of its inputs are energized, said output signal being indicative of the region within said range in which said external quantity lies.

4. A system for selecting one of a plurality of electrical signals, each of said signals having a level which varies as a function of an external quantity, said variations following similar but time displayed curves as said external quantity changes within a predetermined range comprising means for producing said signals, means coupled to said signal producing means and responsive to said signals for producing outputs indicative of the instantaneous polarity of each of said signals, a first plurality of coincidence means, each of said coincidence means having inputs coupled to different selected outputs of said polarity indicating means and producing an output signal upon energization of all of said selected outputs, a plurality of comparator means, each of said comparator means being coupled to said signal producing means for comparing the relative levels of a different pair of said electrical signals, means coupled to each of said comparator means for producing a signal indicative of the relation of said relative levels, a second plurality of coincidence means, each of said second coincidence means having a first input coupled to one of said relative level indicating means and a second input coupled to the output of one of said first coincidence means, each of said second coincidence means producing an output signal only when both of its inputs are energized, said output signal being indicative of the region within said range in which said external quantity lies, gate means coupled to said signal producing means and operable to selectively pass any one of said electrical signals, means coupled to said gate means for utilizing the passed electrical signal, and means coupled to said second plurality of coincidence means and to said gate means and responsive to the signals produced by said second coincidence means for causing said gate means to select different ones of said electrical signals as said external quantity changes regions within said range.

5. A system for determining the region within a range in which an external quantity lies, comprising means for producing a plurality of electrical signals, each of said signals having a level which varies as a function of said external quantity, said variations following similar but time displaced curves as said external quantity changes over said range, a plurality of binary means coupled to said signal producing means, each of said binary means being responsive to one of said electrical signals for energizing a first output if said electrical signal is of one polarity and a second output if said electrical signal is of the opposite polarity, a plurality of coincidence means, each of said coincidence means having inputs coupled to different selected outputs of said plurality of binary means and producing an output signal upon energization of all of said selected outputs, a plurality of comparator means, each of said comparator means being coupled to said signal producing means to compare the levels of a different pair of said electrical signals, a second plurality of binary means, each of said second binary means being coupled to the output of one of said comparator means and responsive to the output thereof for energizing a first output if said output is of a first polarity and a second output if said output is of the opposite polarity, and a plurality of coincidence circuits arranged in pairs, one circuit of each pair having a first input coupled to the first output of one of said second binary means and the other circuit of each pair having one input coupled to the second output of said one second binary means, both circuits of each pair having second inputs coupled to the output of one of said coincidence means, each of said coincidence circuits producing an output signal only when both of its inputs are energized, said output signal being indicative of the region of said range in which said external quantity lies.

6. A system for selecting one of a plurality of electrical signals, each of said signals having a level which varies as a function of an external quantity, said variations following similar but time displaced curves as said external quantity changes within a predetermined range comprising means for producing said signals, a plurality of binary means coupled to said signal producing means, each of said binary means being responsive to one of said electrical signals for energizing a first output if said electrical signal is of one polarity and a second output if said electrical signal is of the opposite polarity, a plurality of coincidence means, each of said coincidence means having inputs coupled to different selected outputs of said plurality of binary means and producing an output signal upon energization of all of said selected outputs, a plurality of comparator means, each of said comparator means being coupled to said signal producing means to compare the levels of a different pair of said electrical signals, a second plurality of binary means, each of said second binary means being coupled to the output of one of said comparator means and responsive to the output thereof for energizing a first output if said output is of a first polarity and a second output if said output is of the opposite polarity, a plurality of coincidence circuits arranged in pairs, one circuit of each pair having a first input coupled to the first output of one of said second binary means and the other circuit of each pair having one input coupled to the second output of said one second binary means, both circuits of each pair having second inputs coupled to the output of one of said coincidence means, each of said coincidence circuits producing an output signal only when both of its inputs are energized, said output signal being indicative of the region of said range in which said external quantity lies, gate means coupled to said signal producing means and operable to selectively pass any one of said electrical signals, means coupled to said gate means for utilizing the passed electrical signal, and means coupled to said plurality of coincidence circuits and to said gate means and responsive to the signals produced by said coincidence circuits for causing said gate means to select different ones of said electrical signals as said external quantity changes regions within said range.

7. A system for converting into digital form one of a plurality of electrical analog signals, each of said signals having a level which varies as a function of an external quantity, said variations following similar but time displaced curves as said external quantity changes within a predetermined range comprising means for producing said signals, a plurality of binary means coupled to said signal producing means, each of said binary means being responsive to one of said electrical signals for energizing a first output if said electrical signal is of one polarity and a second output if said electrical signal is of the opposite polarity, a plurality of coincidence means, each of said coincidence means having inputs coupled to different selected outputs of said plurality of binary means and producing an output signal upon energization of all of said selected outputs, a plurality of comparator means, each of said comparator means being coupled to said signal producing means to compare the levels of a different pair of said electrical signals, a second plurality of binary means, each of said second binary means being coupled to the output of one of said comparator means and responsive to the output thereof for energizing a first output if said output is of a first polarity and a second output if said output is of the opposite polarity, a plurality of coincidence circuits arranged in pairs, one circuit of each pair having a first input coupled to the first output of one of said second binary means and the other circuit of each pair having one input coupled to the second output of one of said second binary means, both circuits of each pair having second inputs coupled to the output of one of said coincidence means, each of said coincidence circuits producing an output signal only when both of its inputs are energized, said output signal being indicative of the region of said range in which said external quantity lies, gate means coupled to said signal producing means and operable to selectively pass any one of said electrical signals, an analog to digital converter coupled to said gate means for converting the passed electrical analog signal to a digital signal, a counter coupled to said converter for storing said digital signal, and means coupled to said plurality of coincidence circuits and to said gate means and responsive to the signals produced by said coincidence circuits for causing said gate means to select different ones of said electrical signals as said external quantity changes regions within said range.

8. The system of claim 7 wherein said analog to digital converter includes means for generating a reference signal, means for comparing said reference signal with each cycle of the selected signal, and means for producing output pulses unless said signals are equal.

9. The system of claim 7 wherein means responsive to the outputs of said plurality of coincidence circuits preset said counter with a digital signal representative of the region in which said external quantity lies.

10. The system of claim 8 wherein further means responsive to the outputs of said plurality of coincidence circuits cause said counter to add or subtract said output pulses to or from said preset digital signal.

11. A system for converting into digital form the optimum of the three stator outputs of a synchro at any given position of the rotor thereof, comprising: first, second and third binary means coupled to the first, second and third stator outputs respectively, each of said binary means having a first output energized if its respective stator output is of one polarity and a second output energized if said stator output is of the opposite polarity; first through sixth coincidence circuits; said first coincidence circuit having inputs coupled to the first outputs of said first and third binary means and the second output of said second binary means; said second coincidence circuit having inputs coupled to the first output of said third binary means and the second outputs of said first and second binary means; said third coincidence circuit having inputs coupled to the first outputs of said second and third binary means and the second output of said first binary means; said fourth coincidence circuit having inputs coupled to the first output of said second binary means and the second outputs of said first and third binary means; said fifth coincidence circuit having inputs coupled to the first outputs of said first and second binary means and the second output of said third binary means; and said sixth coincidence circuit having inputs coupled to the first output of said first binary means and to the second outputs of said second and third binary means whereby the output of any of said coincidence circuits indicates a discrete 60° region in which said rotor is positioned; first, second and third comparators; said first comparator coupled to said first and third stator outputs and producing a signal representative of the difference therebetween; said second comparator coupled to said first and second stator outputs and producing a signal representative of the difference therebetween; said third comparator coupled to said second and third stator outputs and producing a signal representative of the difference therebetween; fourth, fifth and sixth binary means coupled to the outputs of said first, second and third comparators respectively, each of said fourth, fifth and sixth binary means having a first output energized if its respective comparator output is of one polarity and a second output energized if said comparator output is of the opposite polarity; seventh through eighteenth coincidence circuits; said seventh and eighth coincidence circuits each having an input coupled to the output of said first coincidence circuit; said seventh coincidence circuit having a second input coupled to said first output of said fourth binary means, said eighth coincidence circuit having a second input coupled to said second output of said fourth binary means; said ninth and tenth coincidence circuits each having an input coupled to the output of said second coincidence circuit, said ninth coincidence circuit having a second input coupled to said first output of said fifth binary means, said tenth coincidence circuit having a second input coupled to said second output of said fifth binary means; said eleventh and twelfth coincidence circuits each having an input coupled to the output of said third coincidence circuit; said eleventh coincidence circuit having a second input coupled to said first output of said sixth binary means, said twelfth coincidence circuit having a second input coupled to said second output of said sixth binary means; said thirteenth and fourteenth coincidence circuits each having an input coupled to the output of said fourth coincidence circuit, said thirteenth coincidence circuit having a second input coupled to said second output of said fourth binary means, said fourteenth coincidence circuit having a second input coupled to said first output of said fourth binary means; said fifteenth and sixteenth coincidence circuits each having an input coupled to the output of said fifth coincidence circuit, said fifteenth coincidence circuit having a second input coupled to said second output of said fifth binary means, said sixteenth coincidence circuit having a second input coupled to said first output of said fifth binary means; said seventeenth and eighteenth coincidence circuits each having an input coupled to the output of said sixth coincidence circuit, said seventeenth coincidence circuit having a second input coupled to said second output of said sixth binary means, said eighteenth coincidence circuit having a second input coupled to said first output of said sixth binary means; each of said seventh through eighteenth coincidence circuits producing an output only when both its inputs are energized, said individual outputs being indicative of a discrete 30° region in which said rotor is positioned; gate means coupled to said stator outputs and operable to selectively pass any one of said outputs; an analog to digital converter coupled to said gate means for converting the passed stator output to a digital signal; a counter coupled to said converter for storing said digital signal; a first OR circuit having inputs coupled to the outputs of said eighth, ninth, fourteenth and fifteenth coincidence circuits; a second OR circuit having inputs coupled to the outputs of said tenth, eleventh, sixteenth and seventeenth coincidence circuits; and a third OR circuit having inputs coupled to the outputs of said seventh, twelfth, thirteenth and eighteenth coincidence circuits; the output of said OR circuits being coupled to said gate means, said gate means being caused to pass said first, second or third stator output upon receipt of an output form said first, second or third OR circuit respectively.

12. The system of claim 11 wherein means responsive to the outputs of said seventh through eighteenth coincidence circuits preset said counter with a digital signal representative of the 60° region in which said rotor is positioned.

13. The system of claim 11 wherein said analog to digital converter includes means for generating a reference voltage, means for comparing said reference voltage with each cycle of said passed stator output, and means for producing output pulses unless said voltages are equal.

14. The system of claim 13 wherein further means responsive to the outputs of said seventh through eighteenth coincidence circuits cause said counter to add or subtract said output pulses to or from said preset digital signal.

15. The system of claim 14 wherein said further means comprises fourth and fifth OR circuits having outputs coupled to said counter; said fourth OR circuit having inputs coupled to the outputs of said seventh, ninth, eleventh, thirteenth, fifteenth and seventeenth coincidence circuits and said fifth OR circuit having inputs coupled to the outputs of said eighth, tenth, twelfth, fourteenth, sixteenth and eighteenth coincidence circuits, an output from said fourth OR circuit causing said counter to add and an output from said fifth OR circuit causing said counter to subtract.

16. The system of claim 12 wherein said means comprises sixth, seventh, eighth, ninth, tenth and eleventh OR circuits; said sixth OR circuit having inputs coupled to the outputs of said eighth and ninth coincidence circuits; said seventh OR circuit having inputs coupled to the outputs of said tenth and eleventh coincidence circuits; said eighth OR circuit having inputs coupled to the outputs of said twelfth and thirteenth coincidence circuits; said ninth OR circuit having inputs coupled to the outputs of said fourteenth and fifteenth coincidence circuits; said tenth OR circuit having inputs coupled to the outputs of said sixteenth and seventeenth coincidence circuits; said eleventh OR circuit having an input coupled to the output of said eighteenth coincidence circuit; and a coded matrix; said outputs of said sixth through eleventh OR circuits being coupled to said matrix to cause said matrix to preset in said counter a digital signal representative of 60°, 120°, 180°, 300° and 360° respectively.

References Cited

UNITED STATES PATENTS

| | | | |
|---|---|---|---|
| 3,023,959 | 3/1962 | Rabin et al. | 340—347 X |
| 3,091,755 | 5/1963 | Sanner et al. | 340—347 X |
| 3,205,492 | 9/1965 | Young et al. | 340—347 |

MAYNARD R. WILBUR, Primary Examiner

G. R. EDWARDS, Assistant Examiner